United States Patent [19]

Gyugyi et al.

[11] 4,439,823
[45] Mar. 27, 1984

[54] CONVERTING MULTIPHASE POWER FROM ONE FREQUENCY TO ANOTHER USING CURRENT WAVEFORMS

[75] Inventors: Laszlo Gyugyi, Penn Hills; Geoffrey M. Smith, Wilkinsburg; Eric J. Stacey, Penn Hills, all of Pa.

[73] Assignee: Westinghouse Electric Corp., Pittsburgh, Pa.

[21] Appl. No.: 338,777

[22] Filed: Jan. 11, 1982

[51] Int. Cl.³ .......................................... H02M 5/257
[52] U.S. Cl. ...................................... 363/161; 363/10
[58] Field of Search .................................... 363/9–10, 363/39, 43, 159–163, 177

[56] References Cited

U.S. PATENT DOCUMENTS

| | | | |
|---|---|---|---|
| 3,287,622 | 11/1966 | Eckenfelder et al. | 363/161 |
| 3,431,483 | 3/1969 | Lafuze | 363/10 |
| 3,436,641 | 4/1969 | Biringer | 363/10 |
| 3,560,835 | 2/1971 | Rettig | 363/10 |
| 3,641,417 | 2/1972 | Gyugyi | 363/163 |
| 3,832,625 | 8/1974 | Gyugyi | 322/47 |

FOREIGN PATENT DOCUMENTS 1028878  5/1966  United Kingdom .
1397604  6/1975  United Kingdom .

OTHER PUBLICATIONS

Gyugyi et al. "Static Power Frequency Changers", John Wiley & Sons, Inc., 1976, pp. 384–395.

Primary Examiner—Peter S. Wong
Attorney, Agent, or Firm—R. P. Lenart

[57] ABSTRACT a multiphase AC current of one frequency is converted to a multiphase current of another frequency by a frequency changer having its output terminals terminated by a load having the impedance characteristics of a voltage source. In this arrangement the multiple phases of a practical AC current source such as a synchronous generator are connected directly to each load phase, even where the bidirectional switches of the UFC are arranged in pulse groups or a bridge configuration.

21 Claims, 14 Drawing Figures

CONVERTING MULTIPHASE POWER FROM ONE FREQUENCY TO ANOTHER USING CURRENT WAVEFORMS

BACKGROUND OF THE INVENTION

1. Field of the Invention

This invention relates to a method and apparatus for converting multiphase power of one frequency to multiphase power of another frequency. More particularly, it relates to a novel method and apparatus in which segments of an input current waveform are selectively switched to output lines to synthesize an output current waveform having the desired fundamental frequency.

2. Prior Art

In many applications, there is a need for an efficient power supply with a controllable output frequency. One such application is an airborne power generating system where the prime source of electrical power is a rotating generator that receives its mechanical power input from the engine of the aircraft. Since the engine speed varies, usually over a 2 to 1 range, it is not possible for the generator to produce constant frequency output if coupled directly to the engine. Heretofore the general practice has been to insert a hydraulic constant-speed coupling device between the engine and the generator, thereby enabling the generator to operate at a constant speed and hence produce electrical power at a constant frequency. Such a system has several disadvantages, not the least of which is relatively frequent and costly maintenance. These disadvantages can be overcome by an alternative approach in which the generator is directly coupled to the engine, allowing it to produce a variable frequency output power, as dictated by the engine speed. This variable frequency power is then converted into accurately regulated constant frequency output power by means of a static frequency converter.

Two basic types of static frequency converters have been proposed for aircraft power supply applications. One is a so-called DC link type converter, the other is a direct AC-to-AC frequency changer. In the DC link converter arrangement, the alternating voltage of the generator is converted first into a direct voltage by a rectifier circuit, then the direct voltage is converted back to alternating voltage, at the desired frequency, by a static power inverter. In the direct AC-to-AC frequency changer, the available variable frequency generator power is converted directly into constant frequency output power. Thus, the AC-to-AC frequency changer produces the desired output power in a single stage power conversion, whereas the DC link type converter necessitates double power conversion. For this reason, the frequency changer, in principle, has a higher operating efficiency and lower weight than its DC link type counterpart and, therefore, it appears to be the better solution for aircraft power generating systems or similar applications which require controllable frequency power supplies.

Various types of direct AC-to-AC frequency changers have been proposed and developed for aircraft power supply applications. These include the naturally commutated cycloconverter (NCC), the unrestricted frequency changer (UFC), and the unity displacement factor frequency changer (UDFFC). For a more detailed description of these frequency changers, refer to pages 384 to 395 of the book *Static Power Frequency Changers*, by L. Gyugyi and B. R. Pelly, John Wiley and Sons, Inc., 1976. Some additional novel frequency changer arrangements are described in U.S. Pat. No. 3,832,625 and in commonly owned U.S. Patent applications Ser. Nos. 292,975 and 293,045, both filed on Aug. 14, 1981 in the name of Laszlo Gyugyi, now U.S. Pat. Nos. 4,352,155 and 4,353,156 respectively.

The naturally commutated cycloconverter (NCC) employs controlled rectifier type semiconductors (SCRs) with no intrinsic turn-off capability. These devices are commutated (turned off) by the process of "natural commutation," by which the current is transferred without external forcing between the controlled rectifier type circuit elements. This is achieved by proper selection of the switching instants relative to the instantaneous polarities of the input voltages, when the output voltage waveform is synthesized. Natural commutation is desirable because controlled rectifier type devices are presently available with sufficiently high rating in small physical sizes. However, restrictions on output voltage waveform construction needed to satisfy the conditions for natural commutation result in a lagging input power factor (at any load power factor) and in the generation of harmonic components in the output that are difficult to filter. The lagging power factor increases the rating and size of the generator; and the harmonics necessitate a relatively large output filter. For these reasons, much of the weight and size benefits potentially obtainable with direct AC-to-AC power conversion cannot be realized.

All the other AC-to-AC frequency changers (UFC, UDFFC, etc.) require switching devices with intrinsic turn-off capability (e.g., transistors, gate turn-off thyristors, etc.) or an external force commutating circuit. These frequency changers overcome the shortcomings of the NCC and generally offer superior performance characteristics, for example, reduced output harmonic distortion, improved input power factor, etc. However, the types of frequency changers in which the switching devices are forcibly turned off, draw currents with step-like changes from the input source. Since the input source is a generator with an internal inductive impedance, the step-like current changes cause large voltage surges at the input terminals of the frequency changer, and thus across the (open) switching devices. These voltage surges could destroy the switching devices, cause other equipment damage and would also increase the output distortion. In order to limit the magnitudes of the voltage surges to some acceptable value, the prior art frequency changers employ a multiphase input filter arrangement, as proposed in U.S. Pat. No. 3,641,417, or energy absorbing "snubber" circuits.

The prior art frequency changers also require L-C filters to reduce harmonic distortion in the output voltage. The large inductors used in these filters also significantly increase the weight and size of the airborne power system.

In order to increase the power available with given switching devices, it is common to divide them into pulse groups so that more than one switch is supplying power to each output phase at one time. However, if this is done, it is necessary to couple the pulse groups to the common output phase with an interphase transformer since the instantaneous voltages that are being switched at the same time are not equal. If the switching devices are arranged in a bridge configuration, isolation transformers must be used in the output of the frequency changer for similar reasons. Again, in both cases, the transformers add to the weight and size of the power supply.

Basically, the main problem with the prior art frequency changers is that practical generators, in fact, most of the practical AC power sources, have an appreciable inductive source impedance at the relatively high switching frequencies at which the frequency changer is operated. This inductive source impedance resists any rapid change in the input current, that is, it tends to act similarly to a theoretical current source. The prior art frequency changer attempts to overcome this problem by using an input filter, or appropriate snubber circuit, to approximate a multiphase voltage source type termination at its input. However, the input filter can result in an appreciable weight penalty, and the snubber circuit can produce relatively high losses at the frequencies encountered in aircraft power supply applications.

SUMMARY OF THE INVENTION

The present invention, instead of attempting to change the natural current source type characteristics of a practical AC power source, modifies the power circuit so that the input power can be supplied without penalty from a generator or other practical AC power source which acts like a current source. Thus, in the present invention, the bidirectional switches of the frequency changer are connected directly to the output phases of an AC power source having a predominantly inductive output impedance; or, to say it another way, to the output phases of a current source. A power source which has an inductive reactance of 0.2 per unit or greater will exhibit such characteristics. With some generators and other types of AC power sources, it may be necessary to insert an inductor in series with each source phase in order to achieve the necessary inductive reactance. A synchronous generator has sufficient internal inductive impedance that it exhibits the characteristics of a theoretical current source without supplementary inductors when used as the power source for a frequency changer as taught by the present invention.

In order to accommodate a multiphase current source at the input terminals of the frequency changer, it is necessary to terminate the output terminals by a multiphase voltage source; otherwise, the basic problems of the prior art frequency changers, that is, voltage surges and high terminal voltage distortion, would reappear. The term "voltage source" is used here in its broad sense in that the load connected to the output terminals of the frequency changer has the impedance characteristics of a voltage source. This does not mean that the load is necessarily supplying power to the frequency changer since a voltage source, as well as a current source, can absorb power as well as supply it. From a practical standpoint, what is meant here is that the load is not predominantly inductive; it can be predominantly resistive or capacitive.

A practical arrangement for ensuring that the load connected to the output terminals of the frequency changer exhibits the impedance characteristics of a voltage source is to provide shunt impedance means across the output lines which provide low impedance paths for the harmonic currents resulting from switching between currents from successive phases of the A-C current source. The shunt impedances can be a network of series-connected inductors and capacitors forming low pass filters tuned to the major harmonic frequencies. This might be preferable where the ratio of the input to output frequency of the frequency changer is fixed so that the harmonics would be fairly constant. A more universal shunt impedance would be capacitors connected across the output lines having sufficient capacitance to provide low impedance paths and thereby filter out the ripple currents.

An important aspect of the invention is that the bidirectional switches of the frequency changer are connected directly between each phase of the multiphase source and each output line connected to a multiphase load without the need for input filters and/or an L-C output filter. The shunt capacitor which can be used to give the load the characteristics of a voltage source is about the same size as the capacitor used in the prior art L-C output filter, thus eliminating the size, cost and weight of the sizable inductor formerly required. Even where a filter network is used as the shunt impedance across the output lines, the inductors need only be of sufficient size to filter the small harmonic current for which they are tuned, and thus there is a saving in size and weight over the large inductor required in an L-C filter. The capacitors in these tuned filters are also of modest size. Likewise, even where an inductor is required in series with each phase of a current source to raise its inductive reactance, the additional inductance required over the internal inductance of the generator or other AC source is small and there is still a significant size and weight saving over the prior art input filters.

In accordance with the present invention, the bidirectional switches are connected directly between each source phase and each output line even where the switches are arranged in pulse groups so that more than one source phase is supplying power to an output line at the same time. This is possible because the voltage source connected to the output terminals of the frequency changer defines the output voltage, and the currents applied to a particular output line simultaneously by multiple input current source phases are added together to generate the particular output phase current. Thus, no interphase transformers are required between the outputs of the pulse groups. Likewise, where the bidirectional switches are connected in a bridge pattern between isolated current source phases and the output lines, no isolation transformers are required for the output phases.

The present invention encompasses the method of generating an output current waveform of a desired frequency from a multiphase input current waveform of another freuqency as well as the apparatus which carries out the process.

DESCRIPTION OF THE PREFERRED EMBODIMENTS

Figure 1:
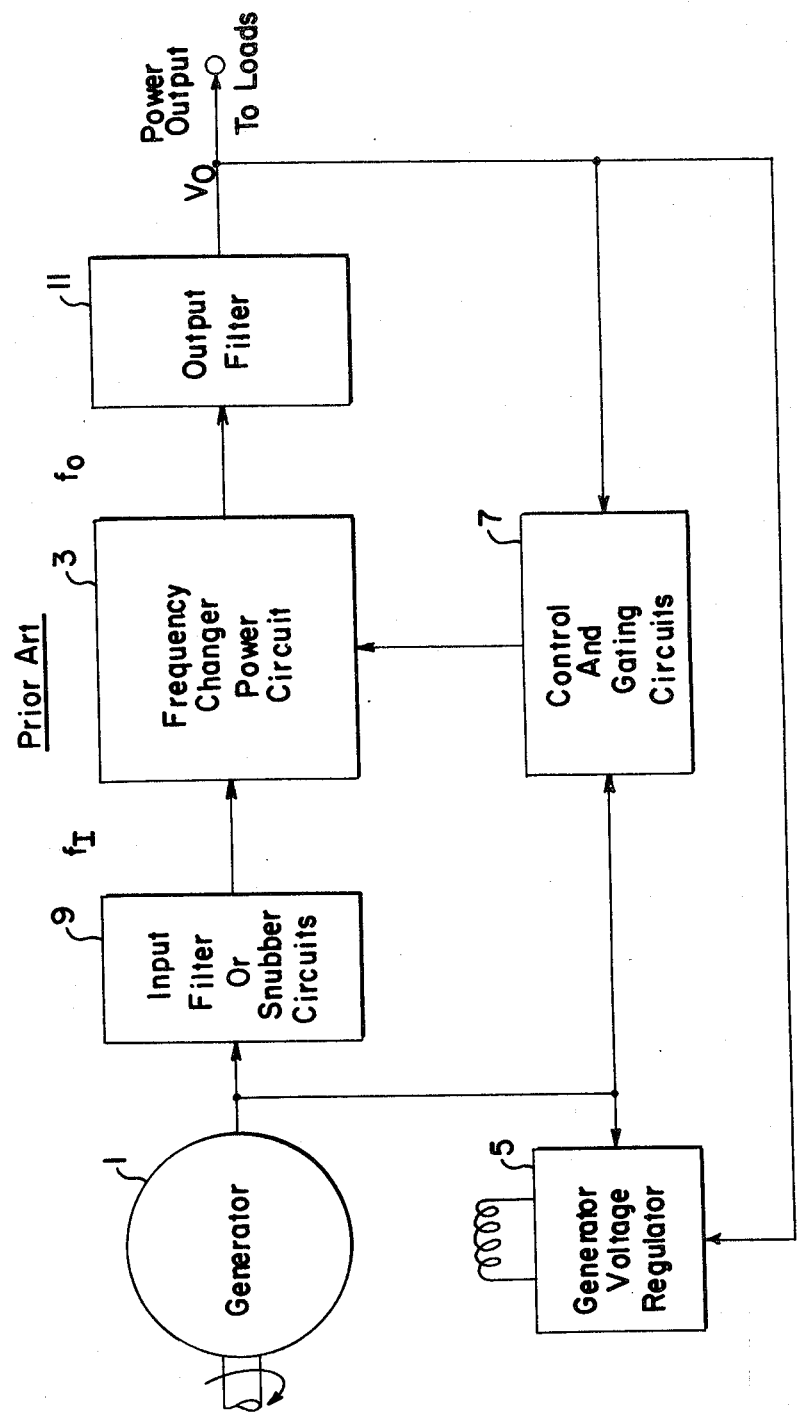
FIG. 1 is a schematic diagram of a prior art variable-speed-constant-frequency power supply system using an AC-to-AC frequency changer.

The present invention can best be understood by first reviewing, in some detail, the construction and operaton of the prior art, voltage fed, frequency changers and the circuits they are incorporated into. A typical prior art aircraft power generating system employing an AC-to-AC frequency changer with turn-off type switching is shown schematically in FIG. 1. The generator 1 provides input power to the frequency changer power circuit 3 at a variable frequency, $f_I$, which is converted into output power at a constant frequency $f_O$ ($f_O$ typically equal to 400 Hz). The internal voltage of the generator 1 is controlled by voltage regulator 5 so as to ensure that the magnitude of the output voltage $v_O$ can be maintained at the desired value under different load conditions. The control and gating circuits 7 operate the switching devices in the frequency changer in an appropriate manner to provide the required input to output frequency conversion. As previously discussed, an input filter or snubber circuit 9 is provided to eliminate voltage surges at the input terminals of the frequency changer power circuit 3 and an output filter 11 removes the ripple voltage in the output waveform.

The frequency changer power circuit is essentially an array of solid state switching devices which provide a matrix of alternative connections between the input (source) and output (load) terminals. A simple frequency changer circuit capable of converting three-phase input power of frequency $f_I$ into three-phase output power of frequency $f_O$ is shown schematically in FIG. 2. The operation of the switches 13 to sequentially apply one input phase at a time to each output line to generate a three-phase output waveform is well understood by those skilled in the art. The switching devices 13 may be bidirectional field-effect transistors or any of various arrangements of transistors whch provide for current flow in either direction, such as those shown in FIG. 4 of commonly owned patent application Ser. No. 292,975 filed on Aug. 14, 1981.

In the prior art, the frequency changer is operated essentially as a voltage wave synthesizer, that is, the output voltage waves, $v_{O1}$, $v_{O2}$, and $v_{O3}$, with the desired frequency and amplitude are produced by sequentially switching chosen segments of voltage waves, $v_{I1}$, $v_{I2}$, $v_{I3}$, of the input voltage source to the output terminals. Thus the output voltage wave of the frequency changer is composed of segments of the input voltage waves, with the time duration of each segment determined by the corresponding switch closure. A typical output voltage waveform, generated by the simple method of connecting each input voltage sequentially to the output for the same length of time, is illustrated in FIG. 3. The control mechanism used to generate this type of output voltage waveform is detailed in the above-identified application Ser. No. 292,975, now U.S. Pat. No. 4,352,155; a frequency changer operated in this manner is termed an Unrestricted Frequency Changer (UFC).

Figure 3A:
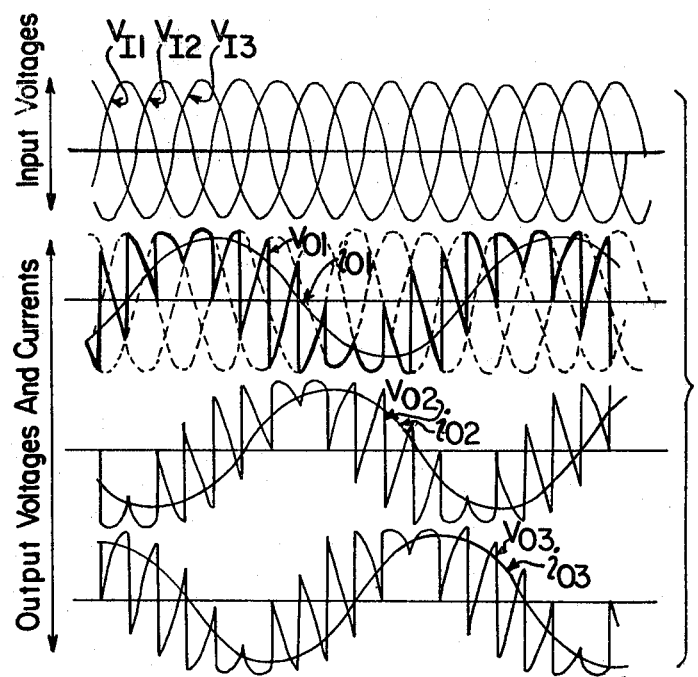
FIGS. 3a and 3b are diagrams illustrating the input and output waveforms of a prior art, 3-pulse, unrestricted frequency changer using a multiphase voltage source to provide the input power.

From the basic operating principle illustrated in FIG. 3a, it follows that the output voltage waveform, generated by the prior art frequency changer described, consists of a fundamental (or wanted) voltage component with superimposed harmonic (or unwanted) components. Since harmonics with large amplitudes are generally not allowed in the output of a power supply, in the prior art schemes they are attenuated by an output filter (usually comprising a series inductor and a parallel capacitor), inserted between the output of the frequency changer and the load, as shown in FIG. 1. With a practical output filter, the output current supplied by the frequency changer to the load (via the filter) can be considered to be essentially sinusoidal.

Figure 3B:
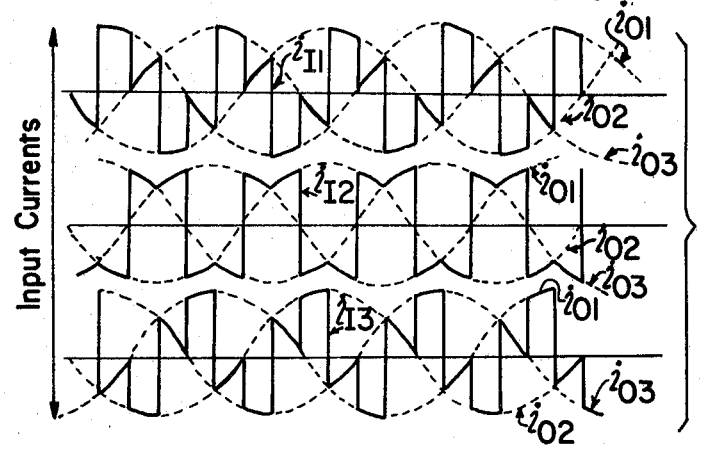

Considering the relationship between the current wave at the output and input terminals, it also follows from the basic operating principle of the frequency changer that the input current waves drawn from the source are built up of segments of the (essentially sinusoidal) output current waves, as illustrated in FIG. 3b. Thus, each input current wave, similar to an (unfiltered) output voltage wave, consists of a fundamental current component of frequency $f_I$ and superimposed harmonic components.

Figure 4:
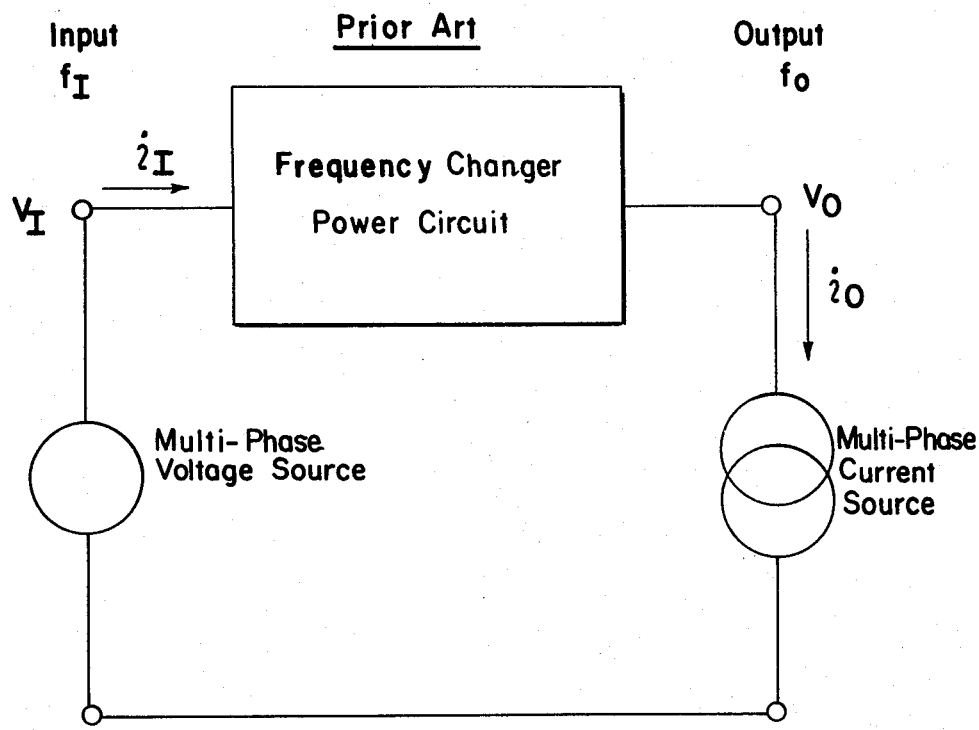
FIG. 4 is a schematic diagram illustrating the theoretical required terminations for a prior art, voltage fed, frequency changer.

In the operation of the prior art frequency changers, it is assumed that the input source is essentially a voltage source (that is, it is a source with a sufficiently small internal impedance) from which harmonic currents can be drawn without essentially influencing the terminal voltage, while the output load (comprising the output filter and the actual load) is assumed to be essentially a current source that draws only fundamental current even if the output voltage contains harmonic components. These theoretical conditions for the proper operation of the prior art frequency changers are schematically illustrated in FIG. 4. The requirement of providing the input power to a frequency changer from essentially a multiphase voltage source has been considered as fundamental in the prior art. Otherwise, as mentioned earlier, and as explained in detail in U.S. Pat. No. 3,641,417, the step-like changes in the input current would cause large and potentially destructive voltage surges at the input terminals which could damage the switching devices in the frequency changer and could also cause an appreciable increase in the distortion of the output voltage wave. In the case of an input source that has an appreciable impedance, such as a practical power generator, it is thus necessary to employ an input filter that can provide a low impedance path for the harmonic currents at the input terminals.

Figure 5:
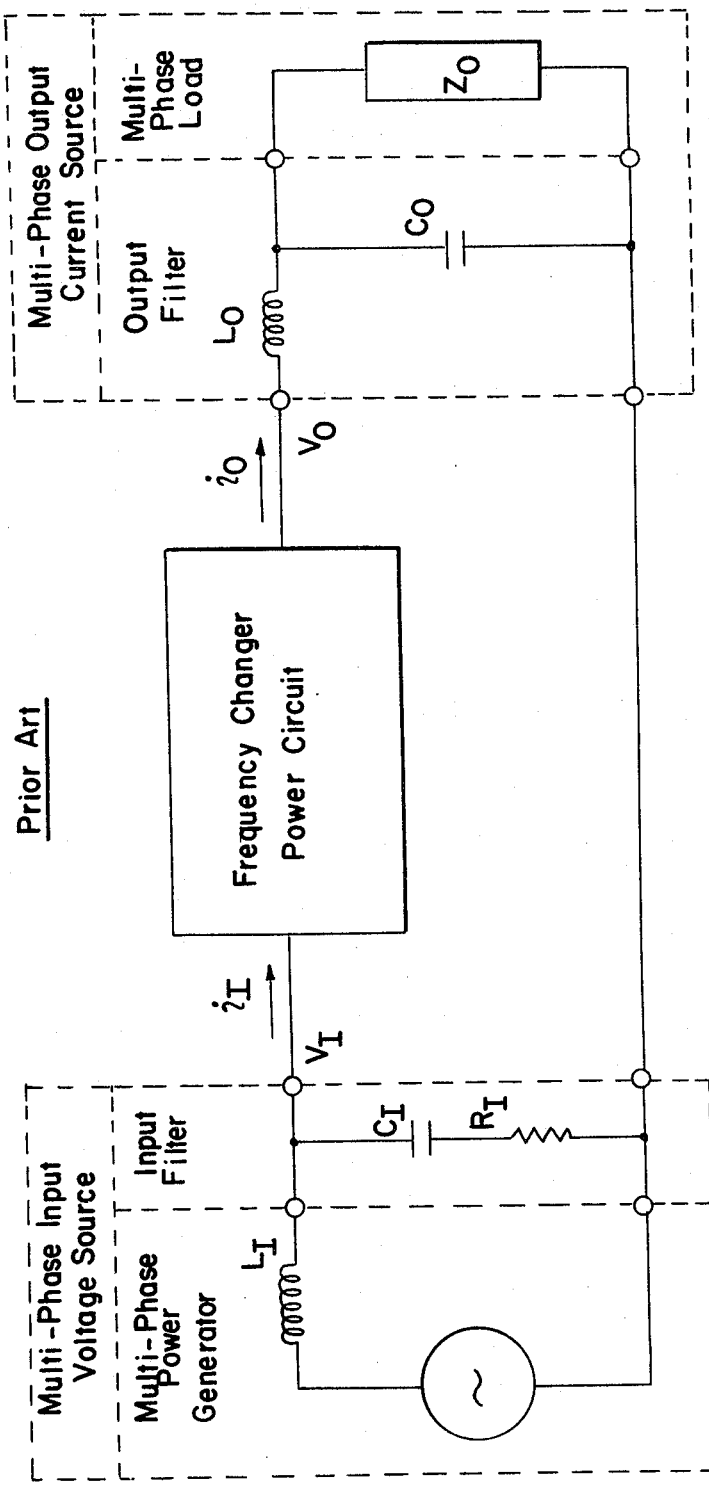
FIG. 5 is a schematic diagram illustrating practical realizations of the voltage and current source terminations for the prior art frequency changer illustrated in FIG. 4.

In a practical prior art power supply, the frequency changer is usually fed from the generator via an input filter to suppress the voltage surges at the input terminals, and the frequency changer supplies the load via an output filter (to meet the output distortion requirements) as illustrated in FIG. 5. The source (generator) with the input filter can be considered as an approximation of an ideal input voltage source, and the output filter with the load as an approximation of an ideal output current source.

Figure 6:
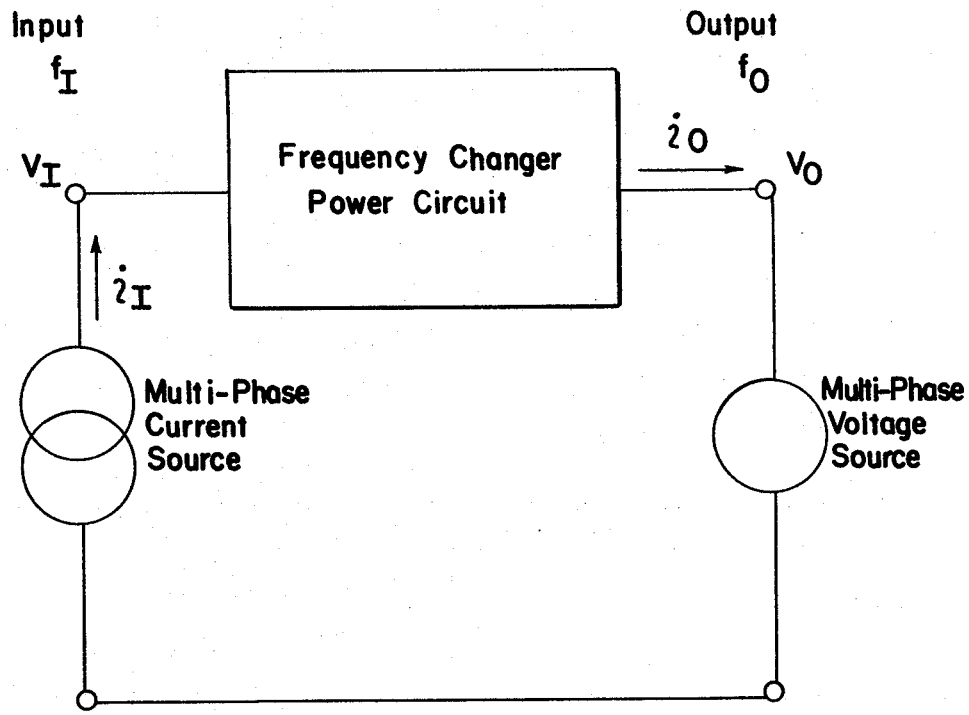
FIG. 6 is a schematic diagram illustrating the theoretical required terminations for a frequency changer constructed in accordance with the teachings of the present invention.

Turning to the present invention, the basic approach is to accept the fact that the practical AC power source acts like a current source. In doing so, however, it becomes necessary to terminate the output terminals of the frequency changer by a voltage source. If this is not done, the basic problems of the practical prior art frequency changer, that is, voltage surges and high terminal voltage distortion, would reappear. Thus, theoretically, the proposed frequency changer scheme is the opposite, or the dual of that used in the prior art; namely, as illustrated in FIG. 6, the input power is supplied from a multiphase current source at frequency $f_I$ and the output power is absorbed by a multiphase voltage source at frequency $f_O$.

Figure 2:
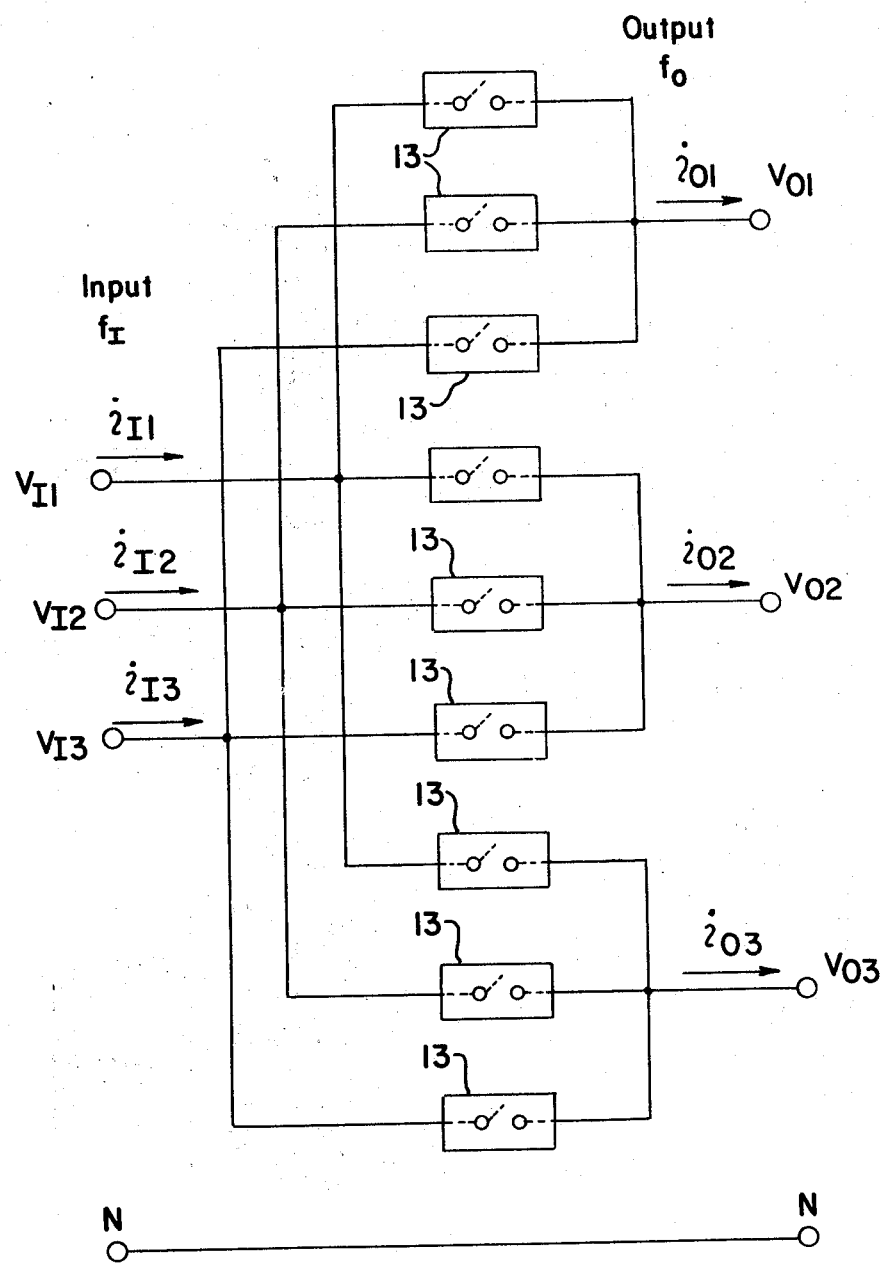
FIG. 2 is a schematic diagram of a 3-pulse frequency changer power circuit with three output phases.
Figure 7A:
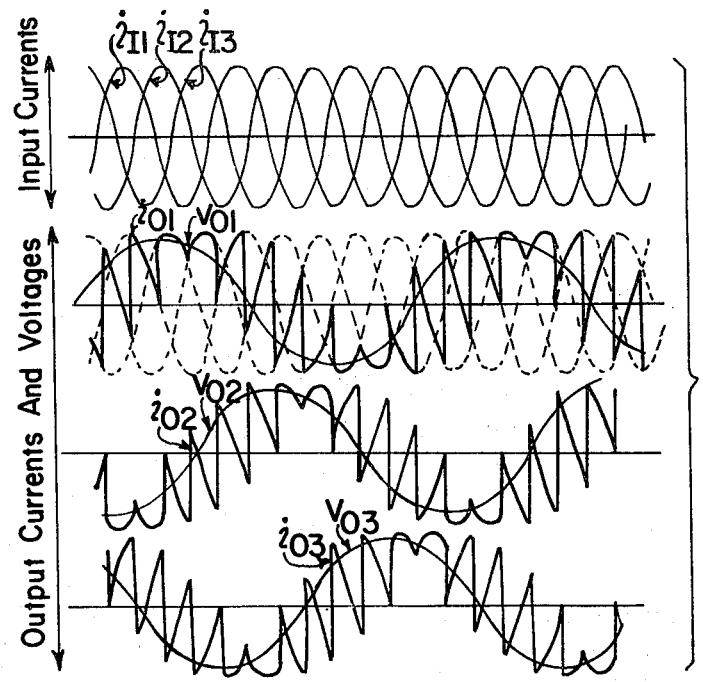
FIGS. 7a and 7b are diagrams of the input and output waveforms of a 3-pulse unrestricted frequency changer according to the teachings of the present invention using a multiphase current source to provide the input power.

The operation of the proposed frequency changer, using the simple 3-pulse switching converter arrangement shown in FIG. 2, operated as an Unrestricted Frequency Changer (UFC), is illustrated by the current and voltage waveforms shown in FIG. 7. The output current waves, $i_{O1}$, $i_{O2}$, and $i_{O3}$, are produced by sequentially switching chosen segments of the input current waves, $i_{I1}$, $i_{I2}$, and $i_{I3}$, of the AC input source to the output terminals (see FIG. 7a). Thus, the output current waves of the frequency changer are composed of segments of the input current waves, and the time duration of each segment is determined by the corresponding switch closure. From the above basic operating principle, it follows that the output current waveform generated by the proposed frequency changer consists of a fundamental (or wanted) current component with superimposed harmonic (or unwanted) components. To avoid the generation of harmonic voltages at the output terminals by the harmonic components of the output current, a low impedance path at the harmonic frequencies has to be provided. In the (theoretical) model considered, the low impedance path at the output terminals is provided by the output voltage source (which actually represents the load and an appropriate output filter).

Figure 7B:
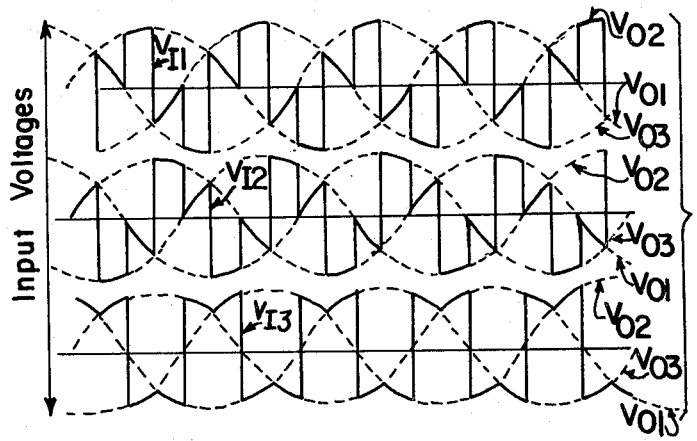

Considering the operation of the proposed frequency changer from the standpoint of the input source, it is evident that the voltage waves appearing at the input terminals are built up from segments of the (essentially sinusodial) output voltage waves, as illustrated in FIG. 7b. Thus, the generated voltage waves at the input terminals, similarly to the current waves at the output terminals, consist of a fundamental voltage component of frequency $f_I$ and superimposed harmonic components.

The opposite or dual nature of the proposed frequency changer, as compared to its prior art counterpart, can be seen clearly by comparing the waveforms shown in FIG. 7 to those shown in FIG. 3, which illustrate the operation of the proposed and prior art frequency changers, respectively.

As seen, the given variables (determined by the input and output circuits) for the prior art frequency changer are the input voltage and output current waves, while the derived variables, namely the output voltage and input current waves, are determined by the operation of the switching devices in the power circuit. By contrast, the given variables (also determined by the input and output circuits) for the proposed frequency changer are the input current and output voltage waves, and the derived variables, which are determined by the operation of the power switching devices, are the output current and the input terminal voltage waves.

Figure 8:
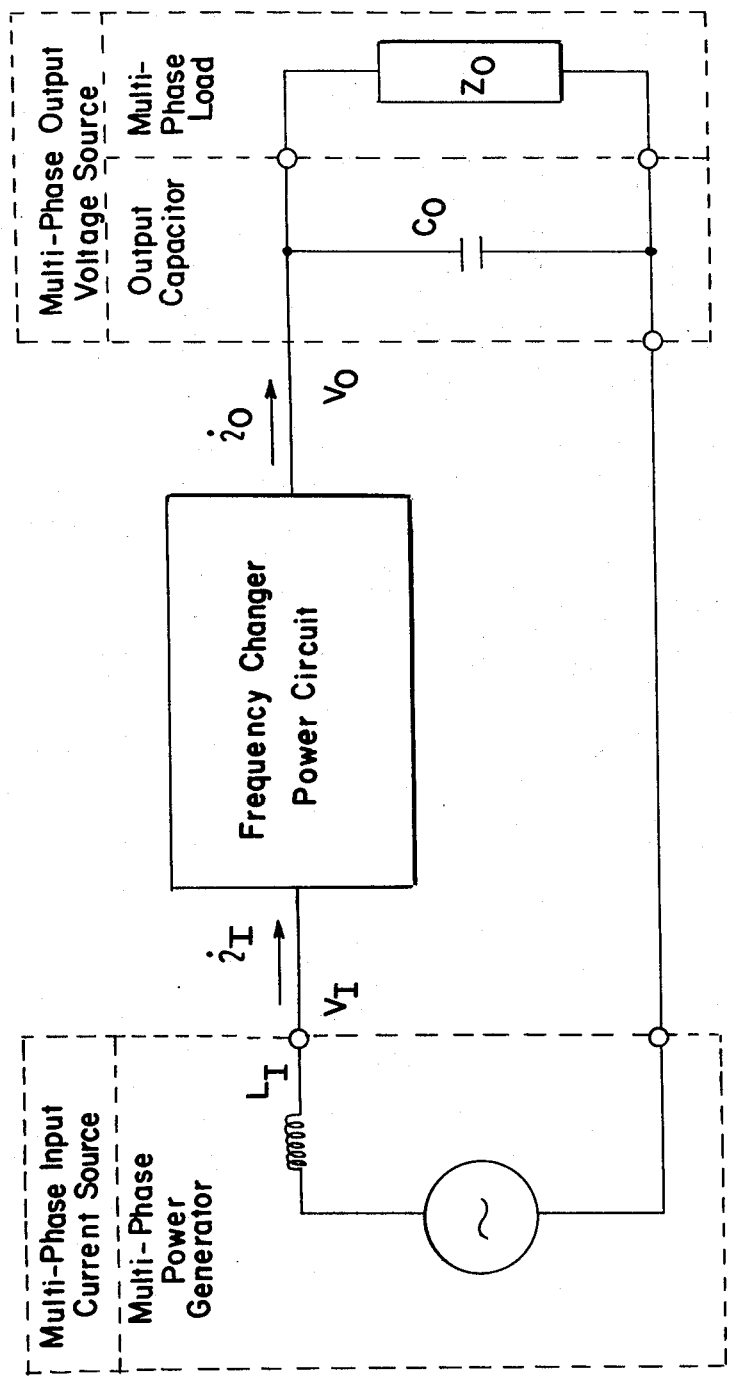
FIG. 8 is a schematic diagram of practical realizations of the current and voltage source terminations for the novel frequency changer illustrated in FIG. 6.

FIG. 8 shows schematically a practical realization of the input and output circuits, which approximate the theoretically stipulated multiphase input current and output voltage sources. Practical experiments showed that a synchronous generator approximates a current source well enough for the proposed frequency changer if its internal reactance $L_I$ is equal to or greater than about 0.2 per unit. For other power sources having a smaller internal reactance, external inductors may have to be added in the input lines. Experiments also showed that the output voltage source stipulated for the proposed frequency changer can be approximated well by a capacitor $C_O$ of appropriate size shunting the load $Z_O$. The size of the capacitor is dependent on the distortion requirements, the pulse number and the operating mode of the frequency changer. However, practical experiments indicated that for the commonly used 6-pulse frequency changer, which operated as a UFC, the admittance of the output capacitor has to be about 0.3 per unit to meet the normal distortion requirements of an aircraft power supply system. Experiments tend to show in general that the value of the output capacitor is about the same for both the prior art and the proposed frequency changers.

Comparison of the proposed frequency changer system illustrated schematically in FIG. 8 to the prior art scheme illustrated in FIG. 5, clearly shows the simplifications, and weight and loss reductions achieved by the invention. The proposed frequency changer needs no input filter or snubber circuits, and the output filter can be reduced to a single capacitor (per phase). In addition, the subtransient reactance that had to be kept small for the prior art frequency changer (which usually necessitated an increase in the size of the generator) can be increased to any convenient value without any apparent penalty in the proposed system.

As known (see for reference the book *Static Power Frequency Changers*, pages 38–50), multiphase frequency changer circuits can be composed of basic 3-pulse groups. The purpose of increasing the pulse number is usually to reduce the output distortion and to increase the rating of the frequency changer power circuit. In the application of an aircraft power generating system, usually midpoint frequency changer power circuits are employed. Since frequency changers need a separate power circuit for each of the output phases, the midpoint circuits have the advantage that three such circuits can be connected directly (i.e., without an isolation transformer) to a common input source (generator) to produce the three outputs of a three-phase system.

As explained in the above reference and in U.S. Pat. No. 3,999,112, each 3-pulse group of a prior art multiphase frequency changer circuit generates an output voltage wave with identical fundamental component but with generally differing instantaneous values. Thus, to absorb the instantaneous voltage differences when the outputs of the 3-pulse groups are combined, the prior art frequency changers circuits normally include interphase transformers. A typical 12-pulse power circuit arrangement used in a prior art frequency changer is shown schematically for a single output phase in FIG.

9. Such a circuit requires three interphase transformers 15. It is understood that three such circuits, in which the switches in corresponding 3-pulse groups for each phase are operated sequentially as described in connection with FIG. 2, are required to provide 3-phase output. The input power for these circuits, as explained previously, is provided by a multi-phase voltage source which is normally realized by providing a filter network (not shown in FIG. 9) at the input terminals of the frequency changer power circuit.

Since the proposed frequency changer generates an output current waveform instead of a voltage waveform, and the output voltage is defined by the output circuit (output filter capacitor and load) which is common to all 3-pulse groups of the multiphase power circuits, interphase transformers are no longer required to combine the outputs of the 3-pulse groups. Thus, multipulse midpoint power circuits can be constructed simply by connecting the outputs of the constituent 3-pulse groups together as illustrated for a 12-pulse power circuit in FIG. 10. In the circuit arrangements shown, the input power is, as explained previously, assumed to be provided by a current source (which in practice can be approximated simply by a generator with its internal-subtransient-impedance). It should be understood that the circuit arrangement shown in FIG. 10, with the stipulation that each power switching device is in conduction for 120 electrical degrees as in 3-pulse frequency changer, is possible only if the impedance of the power generator is sufficiently large to make it act essentially like a current source. It is further pointed out that although for clarity FIG. 10 shows power circuits for single phase output, the proposed frequency changer assumes a multiphase to three-(multi-) phase power conversion using three (or more) such circuits, in which case the continuous flow of the input source current, to one or the other output phases, can be maintained through the normal operation of the switching devices in the power circuit.

Figure 9:
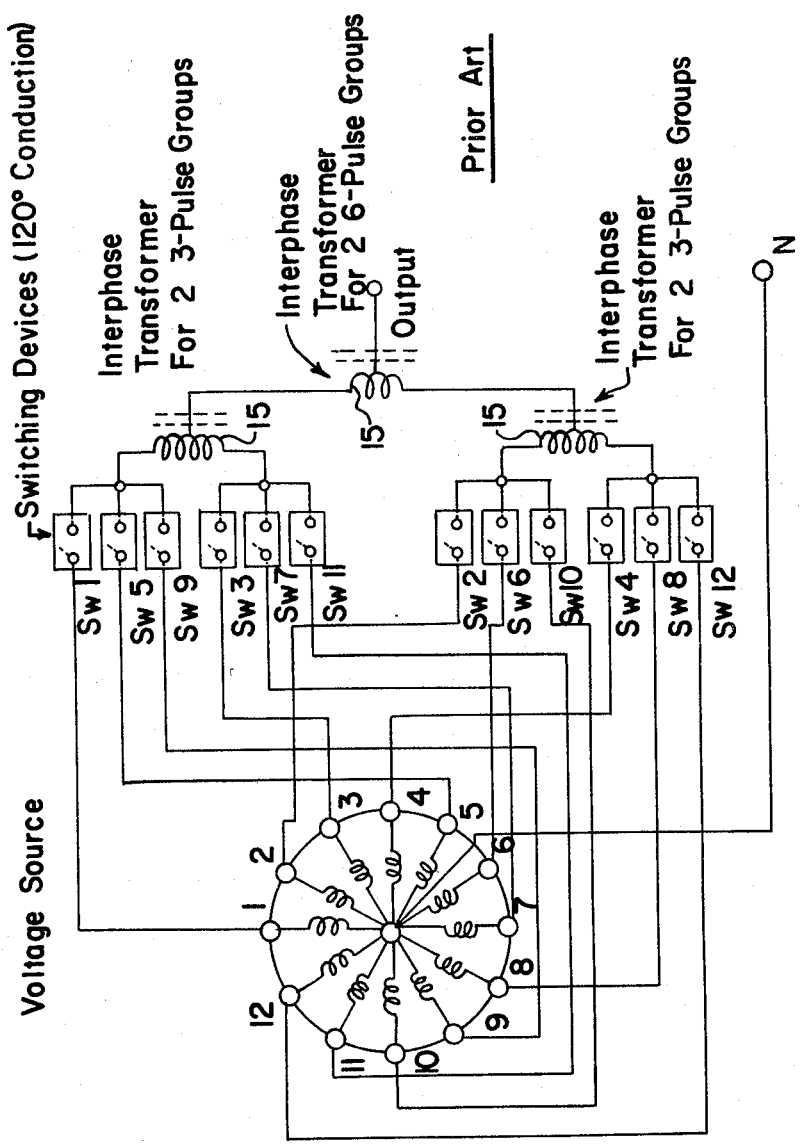
FIG. 9 is a schematic diagram of a 12-pulse midpoint connected power circuit arrangement for a prior art frequency changer.
Figure 10:
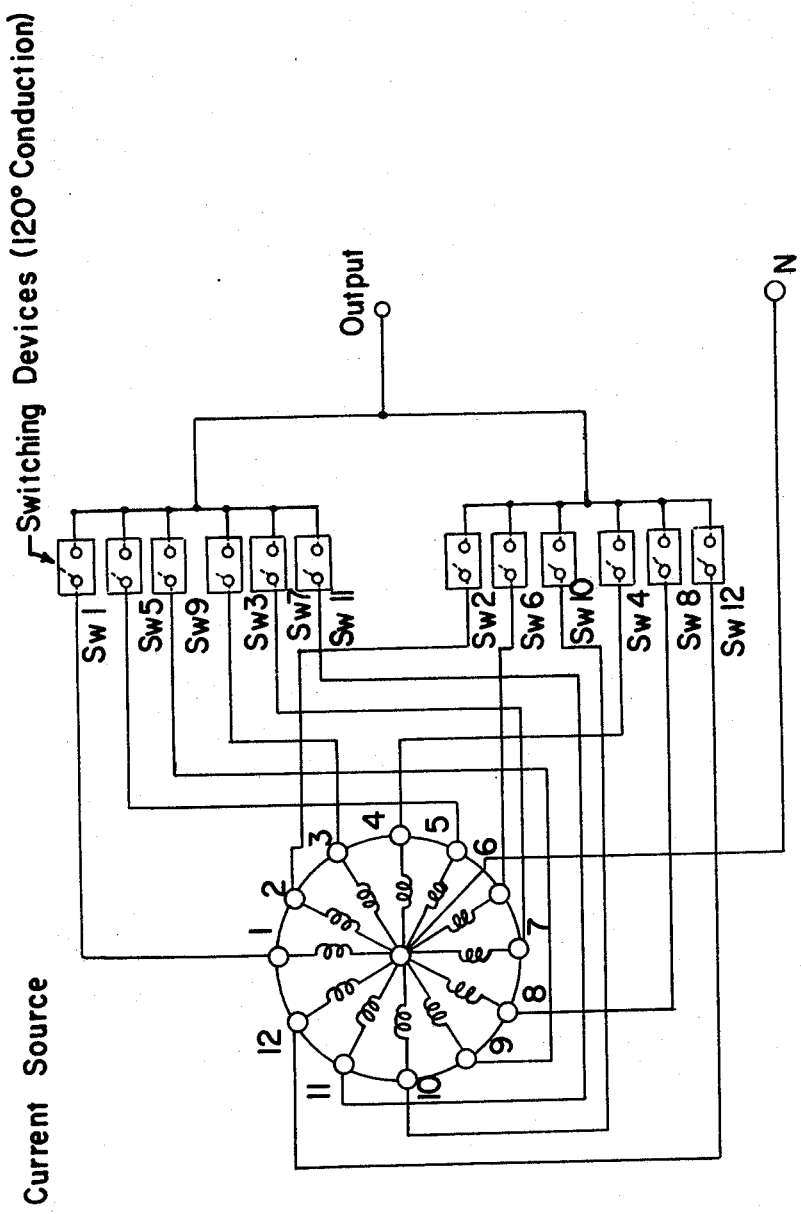
FIG. 10 is a schematic diagram of a 12-pulse midpoint connected circuit arrangement for a frequency changer according to the present invention.

Comparison of FIG. 10 with FIG. 9 clearly indicates that the proposed frequency changer scheme has advantages in terms of simplicity, efficiency, and weight over its prior art counterpart when the application requires the use of multipulse power circuits.

Figure 11:
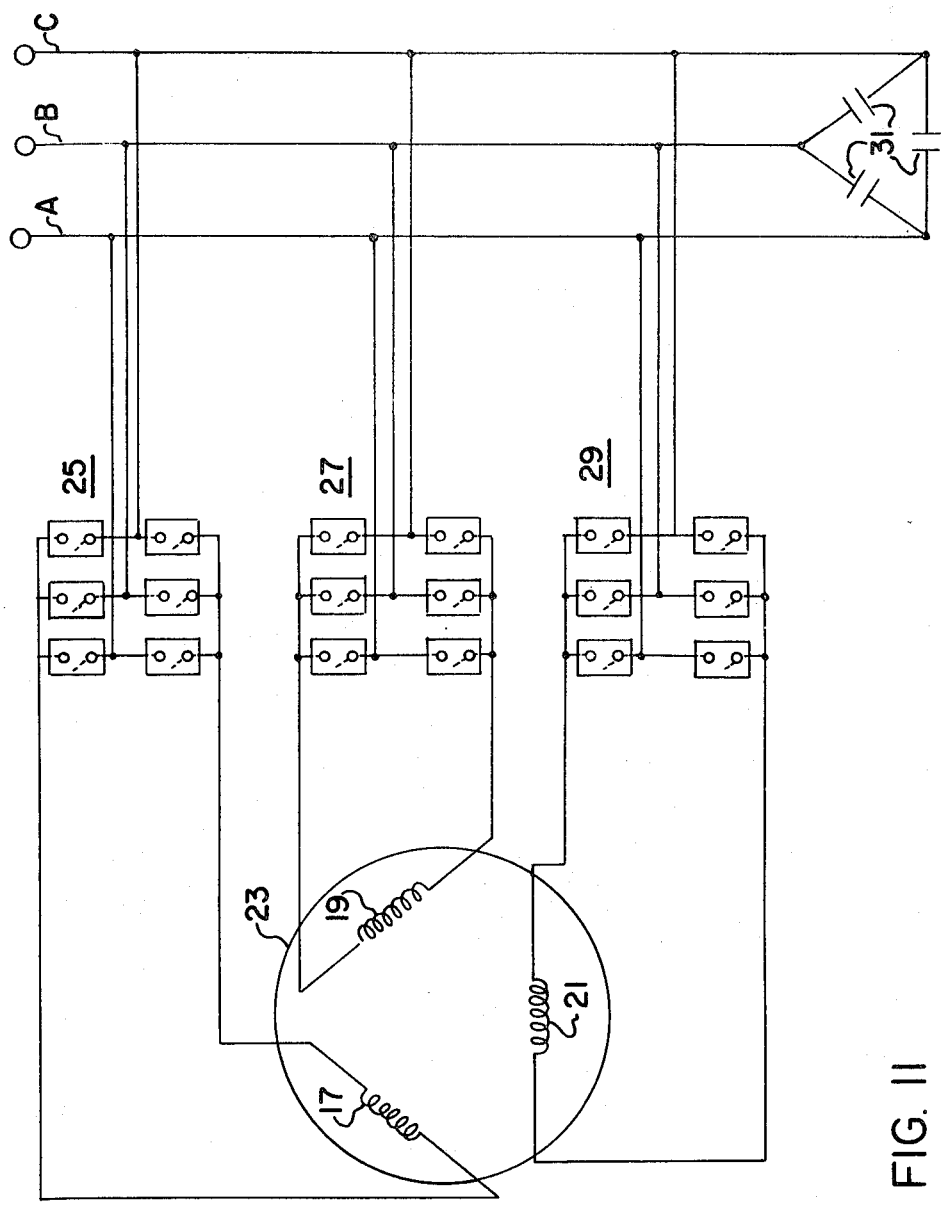
FIG. 11 is a schematic diagram of a bridge connected circuit arrangement having three output phases according to the invention.
Figure 12:
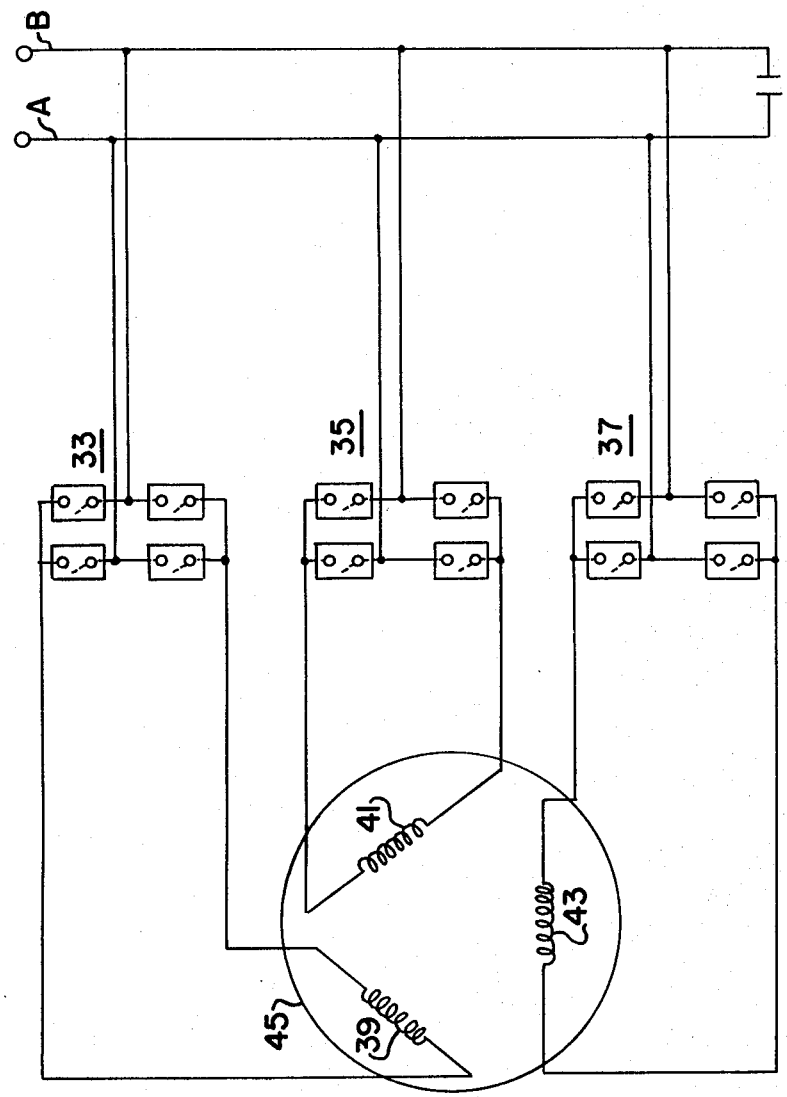
FIG. 12 is a schematic diagram of a bridge connected circuit arrangement for a frequency changer having one effective output phase according to the invention.

While it has been stated above that the multi-phase power circuits used in aircraft power systems are generally midpoint connected, the present invention can also be applied to power systems in which the load is delta connected. In such an arrangement, as shown in FIG. 11, the phases of the AC current source, here depicted by phase windings 17, 19 and 21 of 3-phase generator 23 each having a high inductive reactance, are isolated from one another but are connected directly to each of the output lines A, B and C through bridge circuits 25, 27 and 29, respectively. Capacitors 31 delta connected between the output lines provide the low impedance path for the ripple currents in the output waveform to give the delta load (not shown) connected to the output lines the impedance characteristics of a voltage source. The switches of the bridge circuits 25, 27 and 29 are sequentially operated so that generator winding 17 is connected across output lines A to B while winding 19 is connected across lines C to A and winding 21 is connected across B to C. The sequence is rotated so that each generator winding is successively applied from each output line to each of the other two output lines in a repetitive pattern. As in the case of the midpoint connected multiphase power circuits, this invention permits each of the isolated phases of the current source to be connected directly to each delta connected output line, in this instance without the necessity of isolation transformers. This is possible because, even though more than one source is connected to the output lines at one time, the output voltage between phases is determined by the capacitors 31 and the currents are merely summed on the output lines. FIG. 12 shows that it is even possible with the present invention to have more than one source phase connected across the same two delta connected output lines simultaneously by bridge circuits. Since in this configuration there are only two output lines A and B forming, in effect, a single output phase, bridges 33 and 35 associated with isolated phase windings 39 and 41, respectively, of current source 45 are operated 180° out of phase with each other. The switches of bridge 37 associated with winding 43 are then operated in phase with one of the other two bridges. Again, no isolation transformers are required as would be necessary with a voltage-fed bridge arrangement.

Generally, any control method that specifies the operation of the power switching devices in the power circuit so as to provide paths for the input line currents all the time is applicable to the proposed frequency changer. The methods used to control the prior art (multiphase to multiphase) frequency changers, that is, the control methods defining the operation of the Unrestricted Frequency Changer (UFC), its complementary counterpart (CUFC) and others described in the previously cited references, *Static Power Frequency Changers,* U.S. Pat. No. 3,832,625, commonly owned U.S. patent application Ser. Nos. 292,975 and 293,045, both filed on Aug. 14, 1981, now U.S. Pat. Nos. 4,352,155 and 4,352,156 respectively, are all applicable to the proposed frequency changer.

It is desirable for an aircraft power generating system to have the capability to absorb power at the fixed frequency output terminals and to supply variable frequency power at the input terminals for the generator. In this way the generator can function as a motor and the power generating system can be used to start the engines of the aircraft on ground.

The power generating system with the proposed frequency changer can "naturally" provide the engine starting function desired. A constant frequency (400 Hz) power supply connected directly to the output of the frequency changer will establish the "output" terminal voltage waves. From these output voltage waves, the frequency changer will generate voltage waves with variable frequency at the input terminals. The multiphase voltage waves will cause currents to flow in the generator stator windings. As a result, the generator, working now as a motor, absorbs electrical power from the constant frequency power supply and delivers mechanical power to drive the aircraft engine.

Although the operation and characteristics of the proposed current-fed frequency changer were explained mostly in relation to an aircraft variable-speed constant-frequency power generating system, it should be evident that the same principles are applicable to other power supply systems involving frequency control. For example, the proposed frequency changer could be used to provide a variable frequency output power, from a fixed frequency input power, to control the speed of AC motors. Accordingly, the particular arrangements disclosed are meant to be illustrative only and not limiting as to the scope of the invention which is to be given the full breadth of the appended claims and any and all equivalents thereof.

We claim:

1. Apparatus for generating a multiphase output waveform of a desired frequency from a multiphase input waveform of another frequency, said apparatus comprising:
   a multiphase AC source for generating said multiphase input waveform, said source having an impedance which is predominatly inductive;
   a plurality of output lines;
   an array of bidirectional switches connected directly between each phase of the AC source and each output line;
   control means for sequentially turning on and off said bidirectional switches associated with each output line in a repetitive pattern such that each phase of the AC source conducts current to only one of said output lines at a time with segments of the current from each phase of the AC source being sequentially applied to the output lines, such that each phase of the AC source conducts current through at least one of said bidirectional switches at all times, to generate thereon the output waveform having a fundamental component of said desired frequency; and
   load means connected across the output lines having an impedance which is sbustantially noninductive.

2. The apparatus of claim 1 wherein the said AC source has an inductive reactance of 0.2 per unit or greater.

3. The apparatus of claim 1 wherein said AC source is a synchronous generator.

4. The apparatus of claim 1 wherein said AC source is a multiphase AC generator with an external inductor in series with each output phase winding.

5. The apparatus of claim 1 wherein said load includes shunt impedance means connected across the output lines directly to the output side of said bidirectional switches, said shunt impedance means providing a low impedance path for the harmonic currents resulting from the switching to the output lines by the bidirectional switches of current segments from successive AC source phases.

6. The apparatus of claim 5 wherein said impedance means comprise capacitors shunting the output lines.

7. The apparatus of claim 5 wherein the shunt impedance means comprises a filter network including a plurality of series connected inductors and capacitors tuned to the principal harmonic current frequencies.

8. A frequency changer for generating on a plurality of output lines connected to a load having the impedance characteristics of a voltage source, a multiphase output waveform having a desired fundamental frequency from a multiphase AC current source, said frequency changer comprising:
   bidirectional switches connected directly between each phase of the AC current source and each output line, and
   control means for sequentially turning on and off said bidirectional switches associated with each output line in a repetitive pattern such that each phase of the AC current source conducts current to only one of said output lines at a time with segments of the current from each phase of the AC current source being sequentially applied to the output line at instants which produce an output current waveform having a fundamental component of said desired frequency and such that at least one bidirectional switch associated with each source phase is on at all times.

9. The frequency changer of claim 8 wherein the phases of the AC current source and the load are midpoint connected, wherein said bidirectional switches connected between the individual output lines and each phase of the AC current source are divided into pulse groups and wherein said control means sequentially turns on and off said switches in a repetitive pattern such that one switch in each pulse group is turned on at all times, said bidirectional switches in each pulse group associated with each output line being connected directly to the output line.

10. The frequency changer of claim 9 including capacitor means connected across the output lines directly to the output side of the associated bidirectional switches.

11. The frequency changer of claim 10 wherein said capacitor means have sufficient capacitance to sink the current transients resulting from the switching to the output lines by the bidirectional switches of current segments from successive source phases.

12. The frequency changer of claim 10 or 11 including a neutral line connected between the midpoint connection of the phases of the AC current source and of the load and wherein said capacitor means are connected between each output line and said neutral line.

13. The frequency changer of claim 8 wherein each phase of the AC current source is isolated and bidirectional switches connecting each source phase to each output line are arranged in a bridge pattern with the bidirectional switches connecting the individual output lines with each source phase all connected directly to said output line.

14. The frequency changer of claim 13 wherein the number of phases of said AC current source exceed the number of output lines and wherein said control means turns on bidirectional switches connecting more than one AC current source phase directly to an individual output line at the same time.

15. The frequency changer of claim 13 including capacitor means connected across the output lines directly to the output side of the associated bidirectional switches.

16. The frequency changer of claim 13 wherein said capacitor means have sufficient capacitance to sink the current transients resulting from the switching to the output lines by the bidirectional switches of current segments from successive source phases.

17. A method of generating a multiphase AC waveform of a desired frequency on a plurality of output lines connected to a load, said method comprising the steps of:
   generating a multiphase AC input current waveform of another frequency;
   sequentially switching segments of each phase of the input current waveform directly to each output line at instants which generate on said output lines a multiphase output current waveform having a fundamental component equal to the desired frequency, such that each phase of the input current waveform is connected to one and only one of said output lines at all times; and
   shunting between the output lines the harmonic components of the output current waveform generated on said output lines.

18. The method of claim 17 including the step of midpoint connecting the phases of the input current waveform, and wherein the step of sequentially switching segments of each phase of the input current waveform to each output line includes switching said current segments in pulse groups with one current segment in each group being switched directly to the associated output line at all times such that more than one current segment from the input current waveform is applied directly to each output line at the same time.

19. The method of claim 18 including connecting a neutral line between the midpoint connection of the phases of the AC current waveform and a midpoint connection of the load and wherein the step of shunting the harmonic components of the output current waveform comprises shunting said harmonic currents to said neutral line.

20. The method of claim 17 wherein each phase of the input current waveform is isolated and wherein the step of sequentially switching segments of each phase of the input current waveform directly to each output line includes switching the current segments in a bridge pattern directly to each output line.

21. The method of claim 10 wherein the number of phases of the input AC current waveform exceeds the number of output lines and wherein said step of sequentially switching segments of each phase of the AC input current waveform directly to each output line includes switching segments of current directly to an output line from more than one phase of the AC input current waveform at a time.

* * * * *